United States Patent [19]

Noe

[11] Patent Number: 5,250,270
[45] Date of Patent: Oct. 5, 1993

[54] CATALYTIC REACTOR BED

[75] Inventor: Stephen A. Noe, Houston, Tex.

[73] Assignee: The M. W. Kellogg Company, Houston, Tex.

[21] Appl. No.: 916,324

[22] Filed: Jul. 17, 1992

[51] Int. Cl.⁵ .............................. B01J 8/04; B01J 10/00
[52] U.S. Cl. ................................... 422/192; 422/148; 422/191; 422/193; 422/195; 422/198; 422/203; 422/218; 55/268
[58] Field of Search ............... 422/148, 191, 192, 193, 422/195, 198, 203, 218; 55/179, 268

[56] References Cited

U.S. PATENT DOCUMENTS

| | | | |
|---|---|---|---|
| 4,230,669 | 10/1980 | Eagle et al. | 422/148 |
| 4,276,265 | 6/1981 | Gillespie | 422/218 |
| 4,346,060 | 8/1982 | Eagle et al. | 422/148 |
| 4,372,920 | 2/1983 | Zardi | 422/148 |
| 4,405,562 | 9/1983 | Zardi et al. | 422/148 |
| 4,482,523 | 11/1984 | Peterson | 422/148 |
| 4,755,362 | 7/1988 | Zardi | 422/148 |
| 4,769,220 | 9/1988 | Zardi | 422/148 |
| 4,904,453 | 2/1990 | Zardi | 422/148 |
| 4,952,375 | 8/1990 | Zardi | 422/148 |
| 4,963,338 | 10/1990 | Zardi et al. | 423/360 |
| 4,976,928 | 12/1990 | Föster et al. | 422/195 |

Primary Examiner—Robert J. Warden
Assistant Examiner—Krisanne M. Thornton
Attorney, Agent, or Firm—John P. Ward

[57] ABSTRACT

A fixed bed, dual-zone radial flow catalytic reactor is disclosed. In particular, the catalyst bed configuration includes a first freeboard outwardly radial flow catalyst zone in series with a second inwardly radial flow zone separated by an interconnecting substantially impermeable catalyst chute to accommodate catalyst settling while preventing hot spots and/or fluidization in the freeboard area. A gas distributor divides the freeboard zone into segments including a bypass segment and one or more catalyst segments. The radial flow of gas through each segment is essentially unaffected by the level of catalyst so that the flow pattern is not adversely affected by catalyst setting in the freeboard zone.

8 Claims, 3 Drawing Sheets

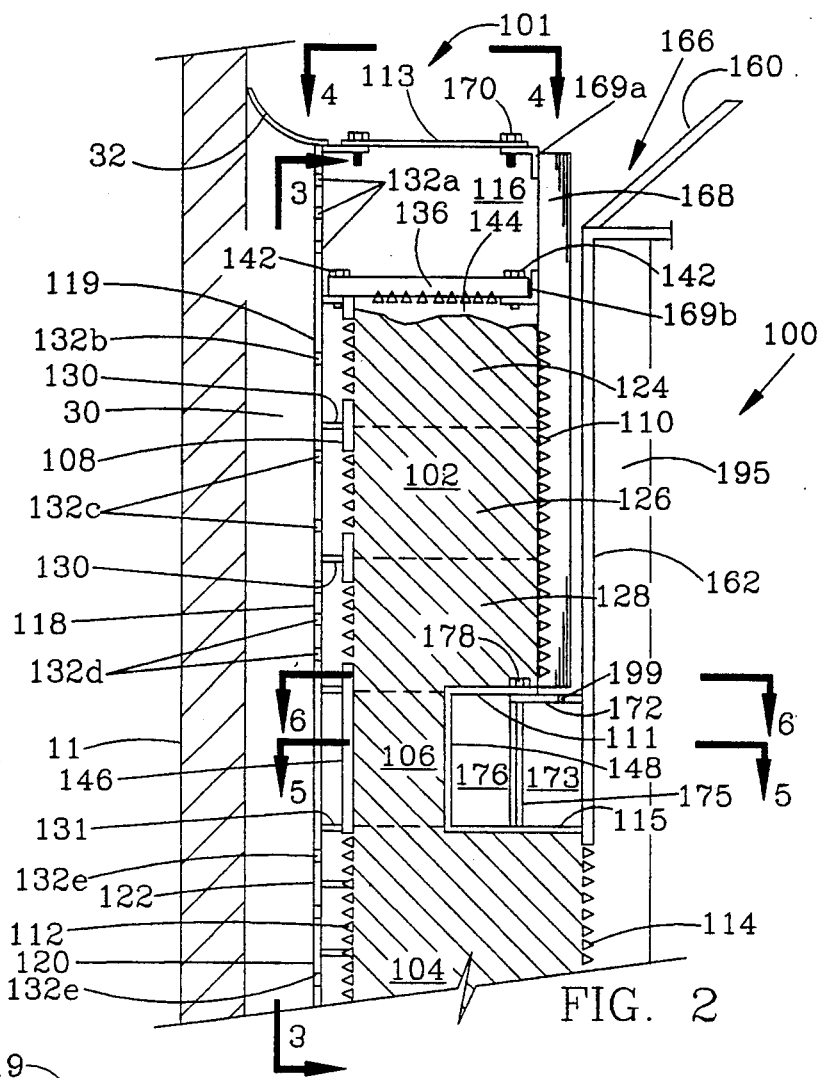
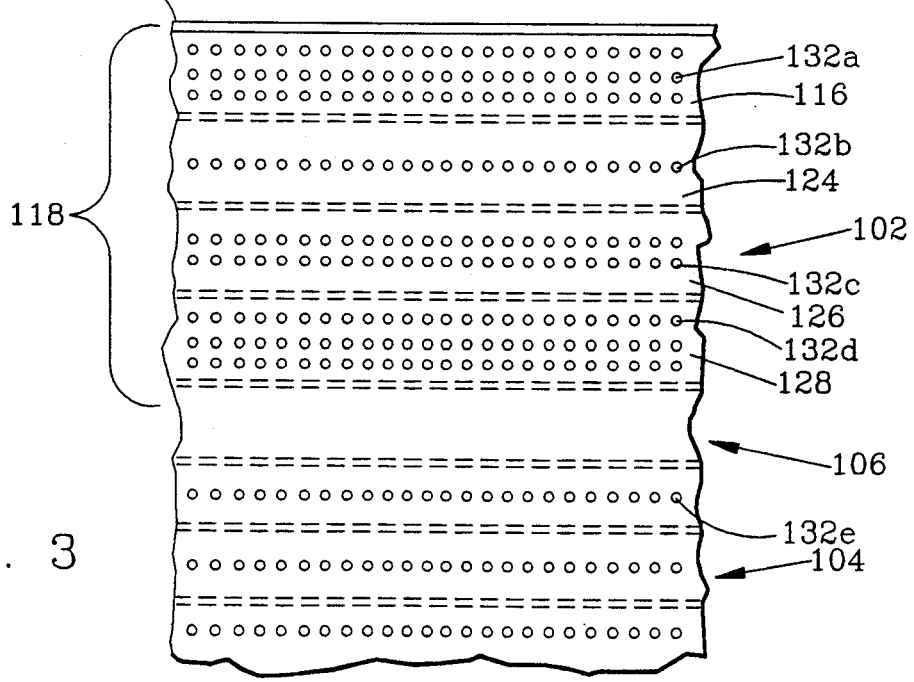

CATALYTIC REACTOR BED

FIELD OF THE INVENTION

The present invention relates to a reactor bed for heterogeneous catalysis. More particularly, the present invention relates to a catalyst bed in a reactor comprising an upper "freeboard" radial flow zone in series with a lower radial flow zone and an outlet segmental distributor for regulating gas flow through the freeboard zone.

BACKGROUND OF THE INVENTION

Ammonia is synthesized today, more or less, by a single process arrangement with the bulk of research designed to improve the catalyst performance and reactor design. In recent years axial flow catalyst beds have been replaced by catalyst beds which use substantially radial or combined axial and radial flows to reduce pressure drop, thereby saving compression energy, and permitting smaller sized, higher activity catalyst to be used. Yet, radial flow based reactors also have some drawbacks associated with the top seal zone of the bed (commonly referred to as the freeboard zone). Drawbacks include regions of low-flow which can result in reduced catalyst effectiveness and localized "hot-spots," as well as a potential for fluidization of the freeboard zone caused by loss of catalyst seal height as the bed settles. Both radial and axial/radial designs require a seal zone of additional catalyst to circumvent excessive bypassing after the catalyst bed has settled.

Recent reactor developments are set forth in a series of Zardi et al. U.S. Pat Nos. 4,372,920; 4,405,562; 4,755,362; 4,769,220; 4,904,453; 4,952,375; and 4,963,338. In Zardi '920, one or more catalyst containing baskets enclosed in a cartridge module have a combination of perforate and imperforate walls said to permit both axial and radial flow through the beds.

In Zardi et al. '562, a heat exchanger arranged centrally and axially in the above cartridge is used to preheat the inlet gas by exchange of heat with the effluent gas. In addition, the preheated inlet gas is mixed with fresh gas for temperature control.

Zardi '362, '453 and '375 describe a procedure for retrofitting axial flow ammonia reactors into an axial/radial flow reactor based on the design described in the above patents.

Zardi '220 describes a heterogeneous synthesis converter containing a variable number of internal cartridges designed similarly to Zardi et al. '562 having several points at which fresh gas can be introduced.

Zardi '338 describes an allegedly improved process for heterogeneous synthesis where the synthesis catalyst is distributed in three catalytic beds, either an axial-radial combination or radial only, and control of the temperature is effected by fresh quench gas and indirect cooling with a central axial mounted exchanger.

U.S. Pat. Nos. 4,230,669 and 4,346,060 to Eagle et al. describe a radial ammonia converter system including first and second heat interchangers and first, second and third catalyst beds.

SUMMARY OF THE INVENTION

Problems experienced in the prior art due to catalyst ineffectiveness including fluidization in the radial design and hot spots in both radial and axial/radial designs are overcome by the present invention using a two-zone radial flow catalyst bed comprising an upper freeboard zone in series with a lower primary zone, and a segmental outlet distributor for regulating gas flow through the freeboard region of the bed as the catalyst settles.

In one embodiment, the present invention provides a catalytic reactor bed adapted for concentric mounting in a vessel. One or more cylindrical baskets having an annular catalyst bed and a central heat exchanger are in fluid communication with the reactant and the effluent gases. The bed comprises a first radial flow freeboard zone and a second radial flow zone interconnected by a catalyst chute. A gas distributor partitions the freeboard zone into a bypass segment and a plurality of catalyst segments, and regulates reactant gas flow through the bypass and catalyst segments. The first and second zones are gas permeable and the catalyst chute is substantially gas impermeable. The bypass segment preferably receives from about 50 to about 75 percent of reactant gas and the catalyst segments from about 25 to about 50 percent of the reactant gas. The proportion of gas flowing through each of the catalyst segments is substantially equal. The heat exchanger in at least the uppermost of the baskets comprises an inner tube bundle adapted to receive cold reactant gas introduced at a lower end of the vessel passing upward therethrough and heated by hot bed effluent gas flowing through a cylindrical shell.

In another aspect, the present invention provides an apparatus for segmental radial gas distribution. The apparatus includes a first gas permeable cylinder wall having upper and lower ends and interior and exterior surfaces, and a second gas permeable cylinder wall concentrically disposed around the first wall. Top and bottom annular gas impermeable rings are fixed adjacent the upper and lower ends. A plurality of gas impermeable, axially spaced annular rings are affixed on the exterior surface between the top and bottom rings to axially partition the first wall into a plurality of radially permeable segments. A plurality of perforations are provided in the second wall for selectively regulating the radial gas permeability of each permeable segment. A gas permeable particulate material is substantially evenly distributed adjacent at least a major portion of the interior surface of the first gas permeable cylinder wall. The apparatus is adapted to distribute a gas flow passing substantially radially through the permeable segments.

BRIEF DESCRIPTION OF THE DRAWINGS

FIG. 2 is a cross-sectional detail of the upper basket of the catalytic reactor of FIG. 1. showing the first radial flow zone, the catalyst chute and a portion of the second radial flow zone.

FIG. 3 is a front perspective view of the upper basket detail of FIG. 2 shown along the lines 3—3 in FIG. 2 illustrating the hole layout of the gas distributor.

DETAILED DESCRIPTION OF THE INVENTION

The present invention is based in part on a design for a radial flow, fixed-bed heterogeneous catalysis reactor which effectively deals with the aforementioned problems in the freeboard region of the catalyst bed.

Figure 1:
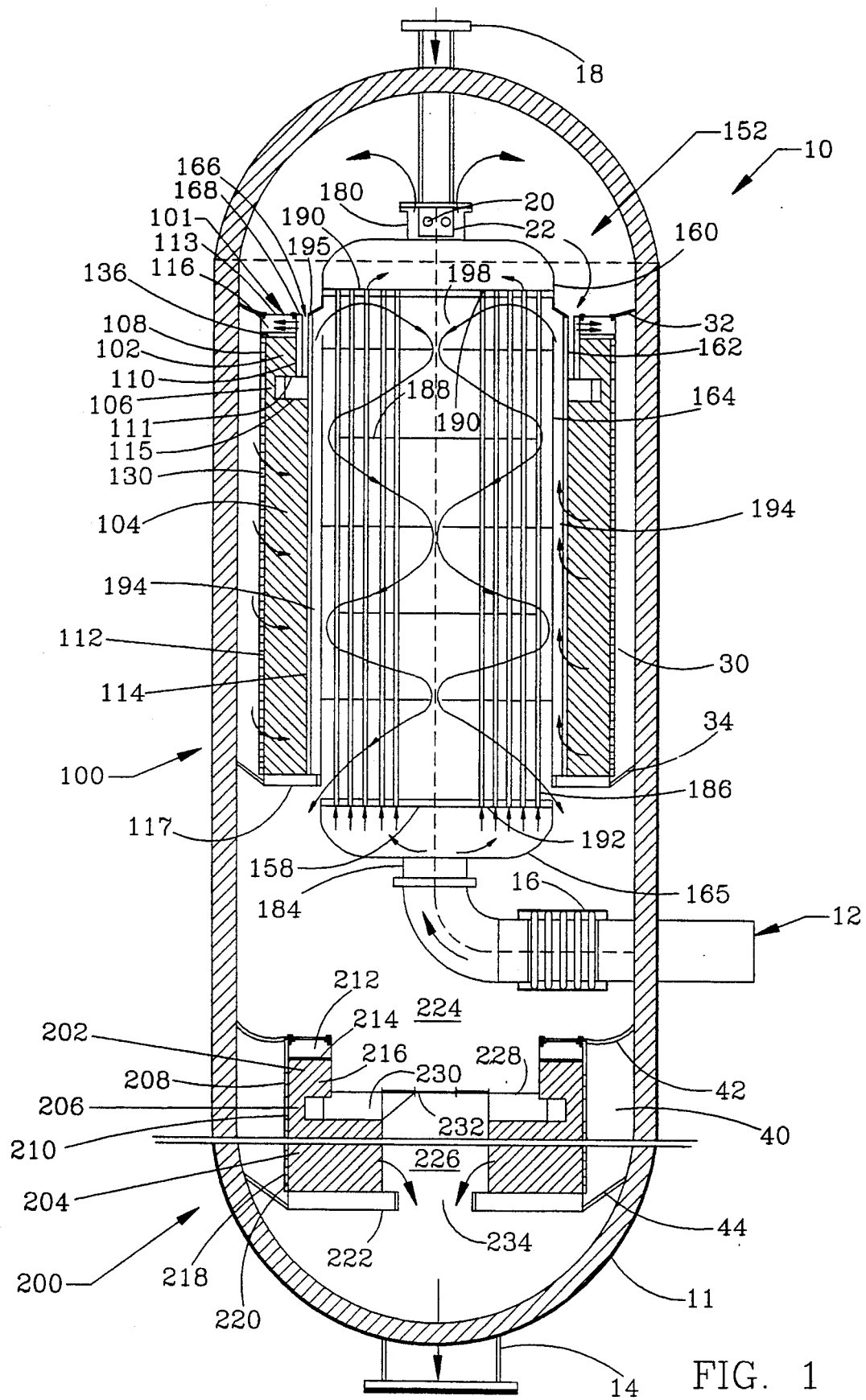
FIG. 1 is a cross-sectional view, partly in perspective, of an embodiment of a catalytic reactor of the present invention showing an upper catalyst basket having an inner heat exchanger and a portion of a lower catalyst basket without a heat exchanger.

Referring to FIG. 1, a catalytic reactor 10 comprises a cylindrical pressure vessel 11 having a pair of cylindrical self-contained catalyst-supporting baskets 100, 200 mounted therein. The vessel 11 includes a primary inlet pipe 12 for introduction of a gaseous reactant mixture, such as, for example, an ammonia synthesis gas, and an outlet pipe 14 for withdrawing an effluent gas, such as, for example, an ammonia-containing product. The inlet pipe preferably has a bellows type expansion joint 16 to increase the deflection capacity and a thermal shield (not shown) to limit heat transfer. Cooling quench gas can be introduced in the upper basket 100 through a secondary inlet pipe 18 having a plurality of holes 20 drilled at an outlet end 22.

While two baskets are illustrated, the number used can vary in accordance with the preference of the practitioner. Typically, the reactor 10 will comprise a series of two or more catalyst beds supported individually by a basket structure. In the present invention, the flow regime through the catalyst beds is characterized by a substantially dual radial flow regime.

As best seen in FIG. 2, the basket 100 comprises an annular shaped catalyst bed 101 which includes a first freeboard radial flow catalyst zone 102 and a second primary radial flow catalyst zone 104 interconnected by a substantially gas impermeable catalyst chute 106. Gas passes from the first zone 102 to the second zone 104 through an annular channel 30 formed between the basket 100 and the wall of vessel 11. The channel 30 is closed at the top by a seal plate 32 and at the bottom by a frustoconical bed support ring 34 (See FIG. 1).

The first zone 102 is bounded by a gas permeable outside cylinder wall 108, a gas permeable inside cylinder wall 110, a gas impermeable lower ring 111, and a removable, gas impermeable top ring 113. Top ring 113 is secured, for example, by bolts 170 to provide access for loading and unloading catalyst. The outside wall 108 and the inside wall 110 are fabricated from a screen material having a mesh size suitable for supporting catalyst particles and posing substantially less resistance to gas flow than the catalyst particles. A portion of the wall 108 can have non-screen sections made from a gas impermeable material as required for partitioning a segmental outlet distributor 118.

The segmental outlet distributor 118 which is attached to the outside wall 108 of the first zone 102 comprises a cylindrical wall 119 having selective gas permeability and a plurality of interior, transverse, gas impermeable partitioning rings 130. The segmental outlet distributor 118 partitions the first zone 102 into a bypass segment 116 containing no catalyst and preferably three contiguous catalyst-containing segments 124, 126, 128. While two or more catalyst segments can be used depending on practical design requirements, three catalyst segments are preferred and shown for illustrative purposes only.

The segmental outlet distributor 118 regulates the reactant gas flow through the first zone segments. As best seen in FIG. 3, holes or perforations of suitable number and size are drilled or otherwise formed in the distributor cylinder wall 119 to specify the desired gas permeability of each segment and establish a radial flow resistance in the segment. In the outlet distributor 118, uniform holes 132a, 132b, 132c, and 132d regulate the proportion of inlet gas passing through the segments 116, 124, 126, and 128, respectively.

The uppermost segment of the first Zone 102 is a bypass segment 116 comprising the gas distributor Wall 119, the gas impermeable top ring 113 and a removable gas permeable lower ring 136. Essentially free of catalyst, the bypass segment 116 limits the space velocity of inlet gas through the catalyst-containing segments of the first zone 102. The bypass segment 116 is open on the inlet side and the lower ring 136 is made from screen material. The lower ring 136 is secured, for example, by bolts 142 to provide access for loading and unloading catalyst. The freeboard segment 124 wherein essentially all catalyst settling preferably occurs is adjacent the bypass segment 116 The middle and lower catalyst segments 126, 128 are adjacent and contiguous to the freeboard segment 124.

The catalyst-containing segments 124, 126, 128 of the first zone 102 are designed to substantially seal and inhibit gas channeling in the catalyst chute 106 with a design parameter for catalyst settling, for example, on the order of about 5 percent overall. Since radial pressure drop in the freeboard segment 124 is almost entirely due to the resistance of the gas distributor 118 (rather than the catalyst), a catalyst void area 144 (due to settling) in the freeboard segment 124 does not significantly reduce the gas flow through segments 116, 126 or 128.

The proportion of inlet gas directed through the bypass segment 116 will depend on the proportion of catalyst in the first Zone 102 and the ratio of the area of holes in the wall 119 in the bypass segment 116 and the other segments in zone 102. However, a sufficient amount of gas should pass through the catalyst segments to avoid excessive temperature rise in the first zone 102. The bypass segment 116 can receive from about 5 to about 95 percent of the inlet gas, but preferably, the bypass segment receives from about 50 to about 75 percent of the inlet gas. The catalyst-containing segments 124, 126, 128 can receive from about 5 to about 95 percent of the inlet gas, but preferably, the catalyst-containing segments receive from about 25 to about 50 percent of the inlet gas.

Gas distribution between the bypass segment 116 and the catalyst segments 124, 126, 128 of the first Zone 102 is a function of flow resistance through the area in question. In a preferred embodiment, a ratio of the area of holes in the bypass segment 116 to that of the adjacent segment 124 is from about 5 to about 10 to 1.

The second zone 104 is bounded by a gas permeable outside cylinder wall 112, a gas permeable inside cylinder wall 114, a gas impermeable upper ring 115 and a gas impermeable bottom support ring 117 (See FIG. 1) at the bottom of the basket 100. Second Zone walls 112, 114 are similar to the first Zone walls 108, 110 in materials and construction. Attached to the outside wall 112 of the second zone 104 is a distributor 120 comprising a cylindrical wall 122 having selective gas permeability and transverse, gas impermeable support rings 131. Holes 132e (see FIG. 3) in the cylinder wall 122 uniformly distribute the gas entering the second zone 104.

The first zone 102 can hold from about 4.9 to about 55 percent of the total catalyst volume per basket, the second zone 104 from about 40 to about 95 percent of the total catalyst volume and the catalyst chute 106 from 0.1 to about 5 percent of the catalyst volume per basket. The first zone 102 preferably holds from about 7.5 to about 15 percent, the second Zone 104 from about 83 to about 92 percent, and the catalyst chute 106 from about 0.5 to about 2 percent of the catalyst volume per basket.

Because a relatively even distribution of gas through the first catalyst zone 102 is preferred the radial flow resistance (i.e. the sum of the distributor 118 and catalyst resistance) established in each catalyst segment should be roughly equivalent. A ratio of the area of the holes or perforations (per unit length) in intermediate segment 126 to uppermost catalyst segment 124 is typically from about 1.75 to about 2.25 to 1 and a ratio of hole area per unit length in segment 128 to segment 124 is typically from about 2.5 to about 3.5 to 1.

The catalyst chute 106 comprises a catalyst-containing neck between the first zone 102 and the second zone 104 having an outside cylinder wall 146 and an inside cylinder wall 148, both gas impermeable. Since the catalyst chute 106 is contiguous with the first and second zones 102, 104, gas channeling through the chute 106 can be substantially inhibited by establishing a suitable axial flow resistance. The chute 106 is preferably from about 75 to about 150 mm in length. It is understood that the desirability of greater chute length to inhibit channeling must be balanced by (1) reduced catalyst participation in the reaction; (2) a potential for hot spots developing in any gas which does channel through the chute; and (3) increased bed height. The width of the chute 106 is based primarily on the continuity requirement of the catalyst bed and the desire to restrict gas channeling.

Figures 4, 5:
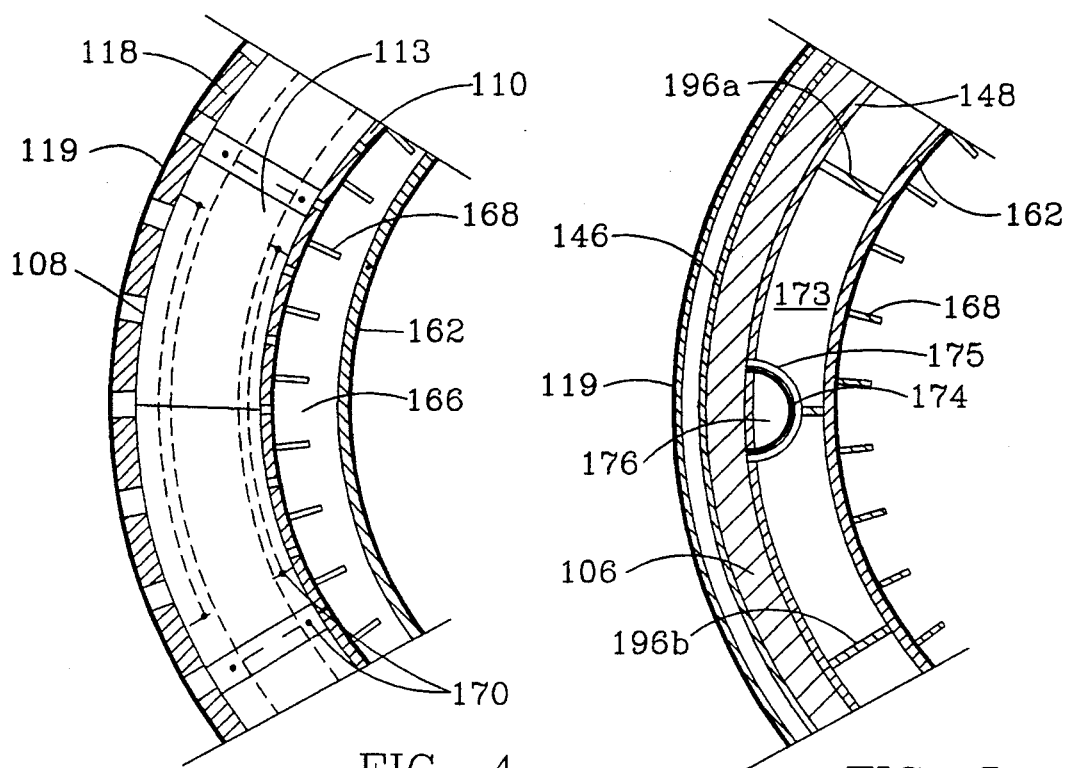
FIG. 4 is a top sectional view of the upper basket detail of FIG. 2 shown along the lines 4—4 illustrating a support bar in an inlet channel to the first radial flow zone.
FIG. 5 is a cross-sectional view of a detail of the upper basket of FIG. 2 shown along the lines 5—5 illustrating a semicircular-shaped catalyst loading and unloading duct and plug.
Figure 6:
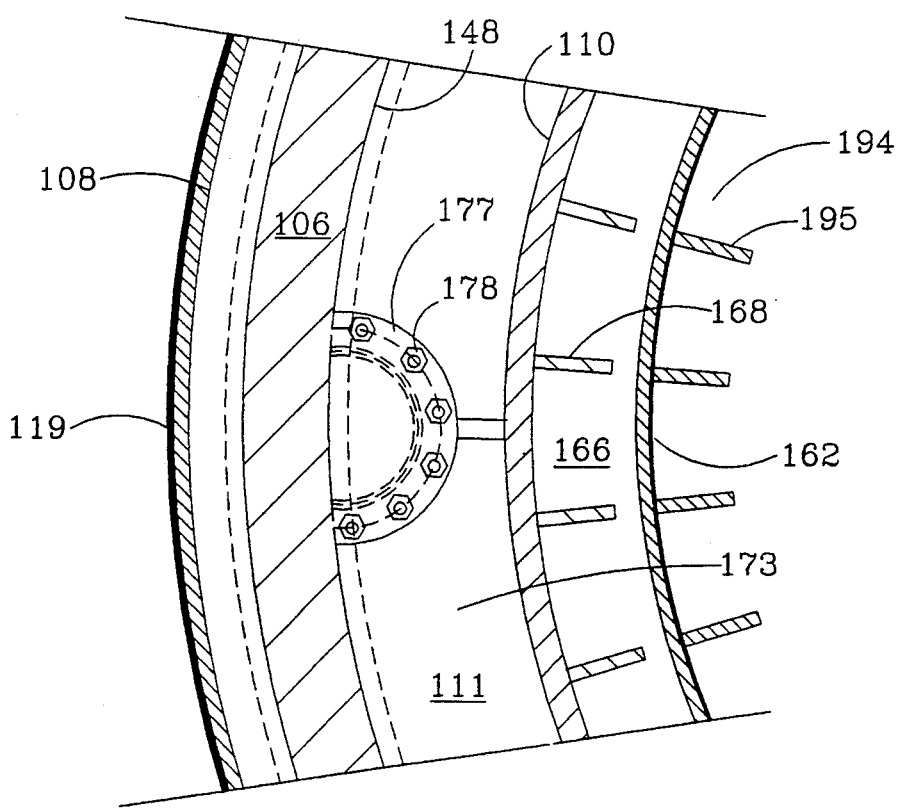
FIG. 6 is a cross-sectional view of a detail of the upper basket of FIG. 2 taken along the lines 6—6 illustrating a semicircular-shaped flanged cover over the catalyst loading and unloading duct and a support bar placement in an outlet channel from the second radial flow zone.

Heat transfer between hot effluent gas leaving the catalyst bed 101 and the incoming synthesis gas is conveniently effected in the centrally mounted heat exchanger 152. Referring also to FIGS. 2, 4 and 6, the heat exchanger 152 comprises a shell including a lower dome-shaped head 165 having an inlet pipe 184 and a tube bundle 158. Cool inlet gas is collected in the lower head 165 and distributed among tubes 186 in the tube bundle 158.

The shell also includes an upper dome-shaped head 160 having an outlet pipe 180 and a gas impermeable cylindrical skirt 162 extending to adjacent the catalyst chute 106. The Wall 110 and the skirt 162 define an annular gas inlet channel 166 to the first zone 102. Inlet gas collected in the upper head 160 flows through the outlet pipe 180 into the inlet channel 166. The annular inlet channel 166 is closed at a lower end by a barrier ring 172 affixed to the skirt 162. The inlet channel 166 preferably has a plurality of radially spaced support bars 168 affixed, for example, by brackets 169a to the bypass segment top ring 113 and by brackets 169b to the bypass segment lower ring 136.

The shell further includes a gas impermeable cylindrical wall 164 extending substantially the length of the tube bundle 158 to define an annular gas outlet channel 194 for gathering and directing the effluent gas in a countercurrent direction through the shell. The outlet channel 194 preferably has a plurality of radially spaced support bars 195.

The tube bundle 158 includes the tubes 186 mounted in first and second tube sheets 190, 192 and horizontally disposed baffles 188. The tube bundle 158 is received in the upper shell head 160 and the shell wall 164 to define a shell-side passage 198 for receiving effluent gas from the outlet channel 194. The horizontal baffles 188 conventionally direct the shell-side gas flow in the passage 198 over the exterior surface of the tubes 186.

As best seen in FIGS. 5 and 6, the basket 100 has an annular void area 173 adjacent the catalyst chute 106 bounded by the inside chute wall 148 and the shell skirt 162. The Void area 173 has a plurality of radially spaced catalyst loading and unloading ducts 174 comprising the inside chute wall 148 and a cylindrical wall 175. The ducts 174 are preferably large enough to allow catalyst loading socks and/or a suitably sized vacuum hose to reach into the second zone 104. When not in use, the duct 174 contains a plug 176 and is closed by a flange 177 secured, for example, by bolts 178 to the lower ring 111 and the channel barrier ring 172. The annular void area 173 is preferably stiffened by braces 196a, 196b. In addition, a plurality of radially spaced vent holes 199 in the barrier ring 172 equalizes the pressure between the annular void area 173 and the inlet channel 166.

The second basket 200 (See FIG. 1) is generally similar to the first basket 100 with the major exception that it does not include an interior heat exchanger. The second basket 200 comprises first and second annular radial flow catalyst zones 202, 204 separated by an interconnecting catalyst chute 206. Gas passes from the first zone 202 to the second zone 204 through an annular channel 40 formed between the basket 200 and the wall of the vessel 11. The channel 40 is closed at the top by a seal plate 42 and at the bottom by a frustoconical bed support ring 44. The first zone 202 is segmented by a gas distributor 208 On a gas permeable outside wall 210 into a bypass segment 212, a freeboard segment 214 and additional catalyst-containing seal segments 216 (which substantially seal the catalyst chute 206). The second zone inlet flow is distributed by a gas distributor 218 affixed to a gas permeable outside wall 220. The second zone is sealed at the bottom by a support ring 222.

The basket 200 includes an interior region defining a gas inlet chamber 224 and a gas outlet chamber 226. The inlet and outlet chambers 224, 226 are separated by a gas impermeable plate 228 supported by a plurality of radially spaced gussets 230. The plate 228 has a manway 232 which provides access to the outlet chamber 226. Effluent gas passes from the outlet chamber 226 through an orifice 234 in the bottom support ring 222.

Both baskets 100, 200 are similarly constructed in their use of dual radial flow catalyst zones. Intrinsic relationships including dimensions of the zones, segments and chute; proportion of catalyst per zone; radial pressure drop per segment; and the like can vary between baskets.

The present reactor can be used in exothermic heterogeneous catalysis reactions, such as, for example, the preparation of ammonia and methanol from synthesis gas comprising a stoichiometric combination of reactants.

Synthesis gas containing, for example, a 3:1 stoichiometric proportion of hydrogen to nitrogen is fed to the inlet pipe 12 of the reactor lo at a suitable pressure. The reactor typically operates at a relatively low pressure of from about 2.5 MPa (25 atm) to about 10 MPa (100 atm). The synthesis gas at the inlet 12 typically has a lower temperature than the effluent gas so that a portion of the reaction heat can be recovered in the heat exchanger 152. The inlet gas in the pipe 12 flows upwards in the tubes 186 in the exchanger 152 and passes through the outlet pipe 180 in the head 160 into the top of the vessel 11. In the outlet pipe 180, the inlet gas is mixed with quench gas fed through the inlet pipe 18. The inlet gas is thus heated to a typical reaction temperature of from about 315° C. to about 415° C.

The heated inlet gas flows through the annular inlet channel 166 and passes into the first radial flow zone 102 of the basket 100. A portion of the inlet gas bypasses catalyst contact initially by entering though the bypass segment 116 in the first zone. The remainder of the gas passes in roughly even proportions through the catalyst-containing segments 124, 126, 128 wherein an ammonia forming reaction occurs. The unconverted bypass gas and substantially all of the remaining partially converted first zone gas passes through the annular channel 30 to the second zone 104 of the catalyst bed.

The recombined gas passes in a substantially even distribution through the catalyst in the second zone 104 wherein an additional partial conversion to ammonia occurs. The effluent gas has a temperature of from about 350° C. to about 450° C. The effluent gas passes from the second zone into the outlet channel 194. In the outlet channel 194, effluent gas is directed to the shell-side passage 198 and passes in a countercurrent direction over the tube bundle 158. A portion of the reaction heat in the effluent gas is exchanged with the inlet gas passing through the tubes 186 and a cooler effluent gas passes from the exchanger 152 into the interior of vessel 11.

The cooled effluent gas from the basket 100 flows generally downwardly through the vessel 11 into the inlet chamber 224 of the second basket 200. A portion of the second basket inlet gas passes through the bypass segment 212 of the first Zone 202 and the remainder passes substantially evenly distributed through the catalyst segments of the first zone 202 wherein an additional portion is partially converted to ammonia. The bypass and catalyst segment streams flow from the first zone and substantially recombine in the channel 40 interconnecting the first and second zones.

The recombined gas passes in a substantially even distribution through the catalyst in the second zone 204 wherein a further partial conversion to ammonia occurs. The effluent having a temperature of from about 350° C. to about 450° C. passes from the second zone into the outlet chamber 226 and out of the reactor 10 through the outlet pipe 14. Ammonia is recovered typically by condensation and the remaining unconverted synthesis gas is recycled through the reactor 10 in a conventional manner.

The foregoing description of the catalytic reactor is illustrative and explanatory thereof. Various changes in the materials, apparatus, and particular parts employed will occur to those skilled in the art. It is intended that all such variations within the scope and spirit of the appended claims be embraced thereby.

What is claimed is:

1. A catalytic reactor bed comprising:
   (a) one or more cylindrical, catalyst supporting baskets concentrically mounted within and spaced apart from a cylindrical wall section of a cylindrical pressure vessel to form annular channels between said baskets and the wall section of said pressure vessel, each of said baskets comprised of a first freeboard, radial gas flow cylindrical catalyst zone defined by spaced apart outside and inside gas permeable cylindrical walls, a second primary, radical gas flow cylindrical catalyst zone defined by spaced apart outside and inside gas permeable cylindrical walls, and a cylindrical catalyst chute defined by spaced apart outside and inside gas impermeable cylindrical walls, said cylindrical catalyst chute being contiguous with and interconnecting said first and second radial gas flow zones;
   (b) an annular bed of heterogeneous catalyst supported within the first and second radial gas flow zones and the interconnecting chute of each of said baskets, and
   (c) a segmental gas distributor means disposed in said first radial gas flow zone of each of said baskets for partitioning said first radial gas flow zone into a bypass segment essentially free of the catalyst and a plurality of catalyst segments, said distributor means regulating the flow of a reactant gas through said bypass and catalyst segments.

2. The catalytic reactor bed of claim 1, further comprising a heat exchanger in an inner region of one of said baskets, said heat exchanger comprising a shell having a gas impermeable cylindrical wall, upper and lower domed-shaped heads and a central tube bundle for receiving cold reactant gas introduced into said lower dome-shaped head and passing upwardly through said tube bundle and heated by hot effluent gas flowing through the shell.

3. The catalytic reactor bed of claim 1, further comprising a second gas distributor means disposed on the outside gas permeable cylindrical wall of said second radial gas flow zone.

4. The catalytic reactor bed of claim 1, wherein said first radial gas flow zone comprises from about 7.5 to about 15 percent of the catalyst in said basket, said second zone comprises from about 83 to about 92 percent of the catalyst and said chute comprises from about 0.5 to about 2 percent of the catalyst in said basket.

5. The catalytic reactor bed of claim 1 comprising a plurality of perforations in a cylindrical wall of said segmental gas distributor means disposed in said first radial gas flow zone for regulating flow resistance in each of the bypass and catalyst segments.

6. The apparatus of claim 5, wherein the ratio of area of said perforations in said bypass segment to that of an uppermost catalyst segment is from about 5 to about 10 to 1.

7. An apparatus for segmental radial gas distribution, comprising:
   (a) a first gas permeable cylindrical wall having upper and lower ends and interior and exterior surfaces;
   (b) a second gas permeable cylindrical wall concentrically disposed around said first wall;
   (c) top and bottom annular gas impermeable rings affixed adjacent said upper and lower ends of said first gas permeable cylindrical wall and a plurality of gas impermeable, axially spaced annular rings affixed on said exterior surface between said top and bottom rings to axially partition said first wall into a plurality of radially permeable segments;
   (d) a plurality of perforations in said second wall for selectively regulating the radial gas permeability of said permeable segments; and
   (e) a gas permeable particulate material substantially evenly distributed adjacent at least a major portion of said interior surface of said first gas permeable cylindrical wall.

8. The apparatus of claim 7, wherein said upper end of said first gas permeable cylindrical wall is essentially free of gas permeable particulate matter adjacent said interior surface.

* * * * *